(12) United States Patent
Mullins et al.

(10) Patent No.: US 9,680,151 B2
(45) Date of Patent: Jun. 13, 2017

(54) SUB-STOICHIOMETRIC, CHALCOGEN-CONTAINING-GERMANIUM, TIN, OR LEAD ANODES FOR LITHIUM OR SODIUM ION BATTERIES

(71) Applicants: Charles Buddie Mullins, Austin, TX (US); Paul Abel, Austin, TX (US); Adam Heller, Austin, TX (US); Kyle C. Klavetter, Round Rock, TX (US)

(72) Inventors: Charles Buddie Mullins, Austin, TX (US); Paul Abel, Austin, TX (US); Adam Heller, Austin, TX (US); Kyle C. Klavetter, Round Rock, TX (US)

(73) Assignee: BOARD OF REGENTS, THE UNIVERSITY OF TEXAS SYSTEM, Austin, TX (US)

(*) Notice: Subject to any disclaimer, the term of this patent is extended or adjusted under 35 U.S.C. 154(b) by 302 days.

(21) Appl. No.: 14/513,951

(22) Filed: Oct. 14, 2014

(65) Prior Publication Data

US 2015/0102257 A1   Apr. 16, 2015

Related U.S. Application Data

(60) Provisional application No. 61/890,439, filed on Oct. 14, 2013.

(51) Int. Cl.
*H01B 1/02* (2006.01)
*H01M 4/58* (2010.01)
(Continued)

(52) U.S. Cl.
CPC .............. *H01M 4/581* (2013.01); *H01B 1/02* (2013.01); *H01G 11/50* (2013.01); *H01M 4/405* (2013.01);
(Continued)

(58) Field of Classification Search
CPC ........ H01M 4/136; H01M 4/581; H01M 4/58; H01M 10/05; H01M 10/0525;
(Continued)

(56) References Cited

U.S. PATENT DOCUMENTS

2009/0117467 A1   5/2009   Zhamu et al.
2012/0077080 A1   3/2012   Liu et al.

FOREIGN PATENT DOCUMENTS

EP            2 541 656 A1      2/2013
KR     20130105773 A  *  9/2013  .............. H01M 4/58
(Continued)

OTHER PUBLICATIONS

Rouette, Hans-Karl. (2001). Encyclopedia of Textile Finishing—Chalcogens. Woodhead Publishing. Online version available at: http://app.knovel.com/hotlink/pdf/id:kt003VS0V6/encyclopedia-textile/chalcogens.*

(Continued)

*Primary Examiner* — Mark Kopec
*Assistant Examiner* — Jaison Thomas
(74) *Attorney, Agent, or Firm* — Baker Botts L.L.P.

(57) ABSTRACT

The disclosure relates to an anode or an electrolytic capacitor electrode including an active anode material containing a chalcogen-containing-germanium composition in which the germanium:chalcogen atom ratio is between 80:20 and 98:2. The disclosure also relates to an anode including an active anode material containing a lithium and germanium-containing alloy wherein the lithium:germanium atom ratio is 22:5 or less. The anode also includes a non-cycling lithium chalcogenide. The disclosure further relates to lithium ion batteries including such anodes. The disclosure additionally relates to capacitor electrodes containing similar materials and capacitors containing such electrodes.

20 Claims, 11 Drawing Sheets
(7 of 11 Drawing Sheet(s) Filed in Color)

(51) Int. Cl.
| | |
|---|---|
| H01M 4/40 | (2006.01) |
| H01M 10/05 | (2010.01) |
| H01G 11/50 | (2013.01) |
| H01G 11/30 | (2013.01) |
| H01M 4/134 | (2010.01) |
| H01M 4/136 | (2010.01) |
| H01M 10/0525 | (2010.01) |
| H01M 10/054 | (2010.01) |
| H01M 4/02 | (2006.01) |

(52) U.S. Cl.
CPC ......... *H01M 4/5815* (2013.01); *H01M 10/05* (2013.01); *H01G 11/30* (2013.01); *H01M 4/134* (2013.01); *H01M 4/136* (2013.01); *H01M 10/054* (2013.01); *H01M 10/0525* (2013.01); *H01M 2004/021* (2013.01); *Y02E 60/13* (2013.01); *Y02T 10/7022* (2013.01)

(58) Field of Classification Search
CPC ......... H01M 10/054; H01M 2004/021; H01M 4/134; H01M 4/405; H01M 4/5815; H01G 11/30; H01G 11/50; Y02E 60/13; Y02T 10/7022; H01B 1/02
See application file for complete search history.

(56) References Cited

FOREIGN PATENT DOCUMENTS

| KR | 1020130105773 | * | 10/2013 | .............. Y02P 70/54 |
|---|---|---|---|---|
| WO | WO 2013082383 A1 | * | 6/2013 | ............ H01M 4/131 |

OTHER PUBLICATIONS

Sean M. Wood et al., "Fast lithium transport in PbTe for lithium-ion battery anodes", J. Mater. Chem. A, 2014, 2, 7238-7243.

Yong-Mao Lin et al., "Sn—Cu Nanocomposite Anodes for Rechargeablel Sodium-Ion Batteries" ACS Appl. Mater. Interfaces 2013, 5, 8273-8277.

Paul R. Abel et al., "Thin Nanocolumnar $Ge_{0.9}Se_{0.1}$ Films Are Rapidly Lithiated/Delithiated" J. Phys. Chem. C 2014, 118, 17407-17412.

Paul R. Abel et al., "Nanocolumnar Germanium Thin Films as a High-Rate Sodium-Ion Battery Anode Material" J. Phys. Chem. C 2013, 117, 18885-18890.

Cho, Y.J. et al. Germanium Sulfide (II and IV) Nanoparticles for Enhanced Performance of Lithium Ion Batteries. Chem. Commun. 49, 4661-4663 (2013).

Kim, Y., Hwang, H., Lawler, K., Martin, S.W.&Cho, J. Electrochemical Behavior of Ge and $GeX_2$ (X=O, S) Glasses: Improved Reversibility of the Reaction of Li with Ge in a Sulfide Medium. Electrochim. Acta 53, 5058-5064 (2008).

Youngsik Kim et al. "Electrochemical behavior of Ge and $GeX_2$ (X=O, S) glasses: Improved reversibility of the reaction of Li with Ge in a sulfide medium" Electrochimica Acta 53 (2008) vol. 53, No. 15, Jun. 1, 2008, pp. 5058-5064.

Partial International Search Report for International Application No. PCT/US2014/060446 filed Oct. 14, 2014, mailing date Jan. 21, 2015, 7 pages.

PCT International Search Report and Written Opinion for International Application No. PCT/US2014/060446 filed Oct. 14, 2014, mailing date Mar. 31, 2015, 17 pages.

PCT International Preliminary Report on Patentability for International Application No. PCT/US2014/060446 filed Oct. 14, 2014, mailing date Apr. 19, 2016, 11 pages.

* cited by examiner

SUB-STOICHIOMETRIC, CHALCOGEN-CONTAINING-GERMANIUM, TIN, OR LEAD ANODES FOR LITHIUM OR SODIUM ION BATTERIES

PRIORITY CLAIM

This application claims priority under 35 U.S.C. §119 to U.S. Provisional Patent Application Ser. No. 61/890,439 filed Oct. 14, 2013. The contents of which are incorporated by reference herein in their entirety.

TECHNICAL FIELD

The present disclosure relates to sub-stoichiometric, chalcogen-containing-germanium, tin, or lead compositions, such as sub-stoichiometric, selenium (Se)-containing-germanium (Ge) compositions or sub-stoichiometric, sulfur (S)-containing-germanium compositions useful in electrodes, particularly anodes, of rechargeable lithium ion batteries or sodium ion batteries. The present disclosure also relates to electrodes and rechargeable batteries containing such compositions, and methods of forming such compositions and methods for their use in electrodes and rechargeable batteries. The disclosure also relates to capacitors containing sub-stoichiometric, chalcogen-containing-germanium.

BACKGROUND

Rechargeable (secondary) lithium ion batteries are widely utilized in consumer electronic devices such as cell phones and laptop computers owing, in part, to their high energy density. Rechargeable lithium ion batteries are also useful in power-intensive applications, such as in electric vehicles and power tools. Additional uses for rechargeable lithium ion batteries, such as in energy grid storage, are also considered.

A rechargeable battery stores electrical energy as chemical energy in two electrodes, an anode and a cathode. In a rechargeable lithium ion battery, the anode and the cathode are electrically insulated from one another inside the battery by an electrolyte and typically also by a separator. The separator is permeable to a lithium-ion electrolyte that allows lithium ions ($Li^+$) to pass between the electrodes inside the battery. The electrons ($e^-$) move through an external electronic circuit. The anode and the cathode normally include compounds into which lithium ions and/or lithium atoms may be reversibly inserted. The electrolyte typically contains a lithium salt dissolved in an organic liquid to produce lithium ions. Often the electrolyte contains an organic liquid, such as a carbonate, an ether, a nitrile or a sulfoxide.

When the lithium ion battery is discharged, electrons move from the anode to the cathode passing through an external device, such as a phone, which is powered by the electron flow, i.e. current. The current flowing through the external device can also be of electron vacancies, i.e. holes. Lithium ions move from the anode to the cathode at the same time. When the lithium ion battery is charged, an outside power source, such as a wall socket, supplies the power required for transporting lithium ions through the electrolyte and electrons through the external circuit from the cathode to the anode. Preferably, the lithium formed of the lithium ions and the electrons, combines with, dissolves in, alloys in, or intercalates in a material of the anode. On discharge the flow of ions and electrons is reversed and the lithium combines with, dissolves in, alloys in, or intercalates in a material of the cathode. The same process occurs, but with sodium ions, in a rechargeable sodium ion battery.

Although some uses are not particularly sensitive to the rate at which a battery charges and discharges, many are. For example, a battery that can recharge in an hour is much more practical for an electric vehicle than one that requires several hours. Similarly, a cell phone battery that recharges in 5 minutes is far more convenient that one that requires 30 minutes. Batteries that discharge rapidly provide more power, e.g., acceleration in an electric vehicle, higher torque for a power tool, or transmission power and range to a mobile telephone.

Currently, there are a variety of cathode materials available for lithium ion batteries that can be charged quite quickly. As a result, the charge time for most lithium ion batteries is currently limited by the anode material. Power-related properties are similarly limited. Some anode materials are capable of supporting charge and discharge rates similar to the capabilities of cathode materials, but these anode materials tend to exhibit other problems. For example, $Mo_3Sb_7$ and $Li_4Ti_5O_{12}$ anodes allow rapid charge and discharge, but at the cost of reducing the voltage of batteries combining these materials with common cathode materials. The power density and the energy density of a discharging battery usually increase linearly with the operating voltage.

Other anode materials exhibit these and other problems. For example, although they provide batteries with high voltages and reasonably quick charge and discharge times, lithium-metal anodes tend to form metal dendrites that cross from the anode to the cathode, resulting in a short circuit within the battery. Yet other anode materials provide for high rates without dendrite formation, but their coulombic capacity, meaning the charge they store per unit volume (volumetric capacity) or per unit mass (gravimetric capacity) is small, making the energy density of the battery low.

Similar issues are encountered with sodium ion batteries, although both cathode materials and anode materials are less developed for such batteries.

New high rate anode materials of high coulombic capacity providing high battery voltages in combination with appropriate cathode materials for lithium ion batteries and sodium ion batteries are needed.

SUMMARY

The present disclosure provides sub-stoichiometric, chalcogen-containing-germanium, tin, or lead compositions, such as sub-stoichiometric, selenium-containing-germanium compositions or sub-stoichimetric, sulfur-containing-germanium compositions, and anodes and lithium or sodium ion batteries containing such compositions. These compositions have the general formula $Q_yX_z$, wherein Q is germanium (Ge), tin (Sn), or lead (Pb), X is a chalcogen, particularly selenium (Se) or sulfur (S) and y:z is between 80:20 and 98:2.

These anodes and batteries may exhibit quick charge and discharge rates, high coulombic capacity, and good cyclability, and may support a reasonably high operating voltage when used in a lithium or sodium ion battery.

The disclosure also relates to an anode comprising an active anode material including a sub-stoichiometric chalcogen-containing composition of the general formula $Q_yX_z$, wherein Q includes germanium, (Ge), tin (Sn), or lead (Pb) or a combination thereof, and X includes a chalcogen or a combination of chalcogens, and wherein y:z is between 80:20 and 98:2.

The disclosure further relates to an anode including an active anode material containing a sub-stoichiometric, chalcogen-containing-germanium composition in which the germanium:chalcogen atom ratio is between 80:20 and 98:2.

The disclosure further relates to an anode including an active anode material containing a lithium and germanium-containing alloy wherein the lithium:germanium atom ratio is 22:5 or less. The anode also includes a non-cycling lithium chalcogenide.

The disclosure also relates to electrodes in a capacitor. The electrodes may have a composition as described herein. In particular, they may contain lithium, germanium, and selenium with a germanium:selenium ratio of greater than 4:1. The electrodes may have a similar composition when the capacitor is uncharged and one may be lithium-enriched, while the other is lithium-depleted, when the capacitor is charged.

BRIEF DESCRIPTION OF THE DRAWINGS

The accompanying figures, which are incorporated in and constitute a part of this specification, illustrate several aspects and together with the description serve to explain the principles of the invention. The current specification contains color drawings. Copies of these drawings may be obtained from the USPTO.

FIG. 2A presents a low magnification scanning electron microscope (SEM) image of a $Ge_{0.9}Se_{0.1}$ electrode deposited at 70° from surface normal. FIG. 2B presents a high magnification SEM image of a $Ge_{0.9}Se_{0.1}$ electrode deposited a 70° from surface normal. FIG. 2C depicts an X-ray diffraction (XRD) pattern of a $Ge_{0.9}Se_{0.1}$ electrode compared to that of a blank substrate. FIG. 2D depicts energy-dispersive X-ray spectroscopy (EDX) results for a $Ge_{0.9}Se0.1$ electrode showing an elemental composition close to the nominal value.

FIG. 3A presents lithium insertion/extraction voltage profiles for cycles 1, 2, 5, and 10 at C/10. FIG. 3B presents a cyclic voltammogram at a scan rate of 0.1 mV/s. FIG. 3C depicts specific capacity versus cycle number for cycling at rates from 10 C-100 C. FIG. 3D depicts voltage profiles for the $10^{th}$ cycle at each C-rate for $Ge_{0.9}Se_{0.1}$.

FIG. 14A shows voltage profiles for the first lithiation/delithiation cycle of $Ge_{1-x}S_x$ and pure Ge films. FIG. 14B shows the voltage profiles for Ge at various C-rates. FIG. 14C shows the voltage profiles for $Ge_{0.95}S_{0.05}$ at various C-rates. FIG. 14D shows voltage profiles for $Ge_{0.9}S_{0.1}$ at various C-rates.

FIG. 17A shows the nanocolumnar morphology of the electrode. FIG. 17B shows nanocrystalline inclusions.

DETAILED DESCRIPTION

Figure 1:
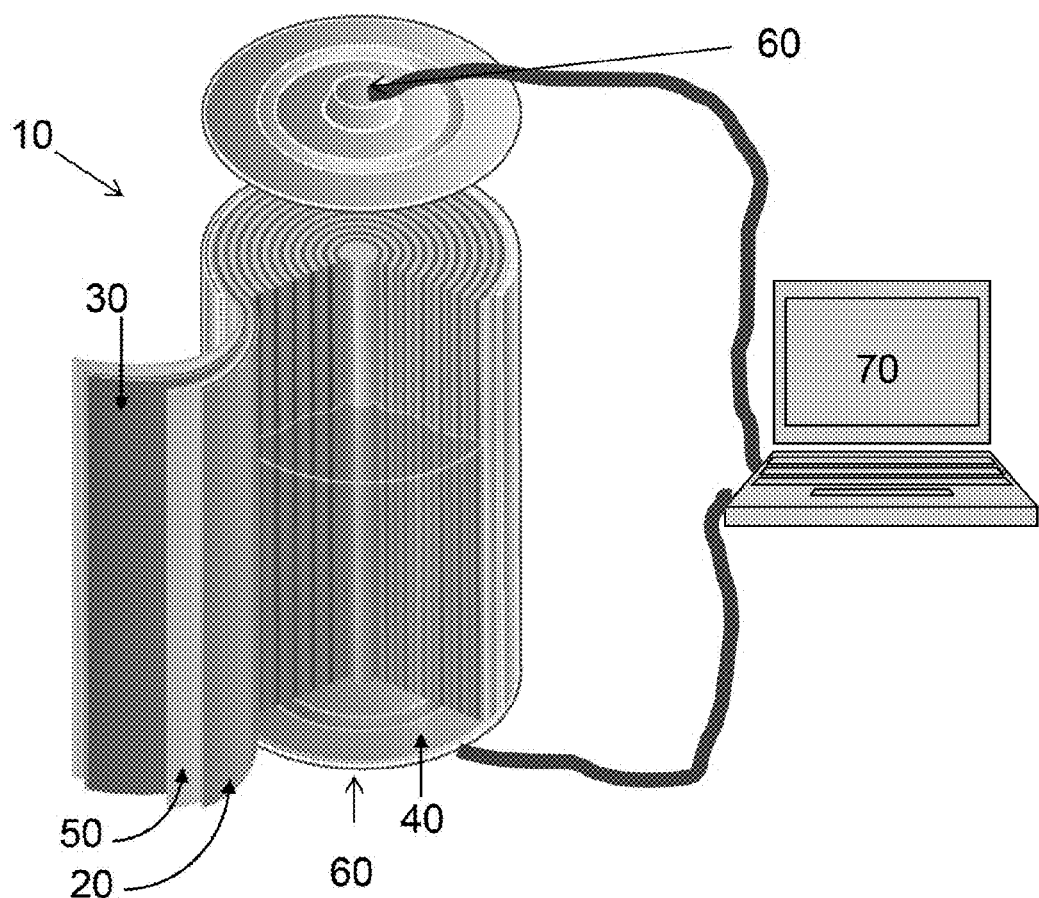
FIG. 1 depicts a rechargeable lithium ion battery with an anode containing a chalcogen-containing-germanium composition.

The present disclosure relates to sub-stoichiometric, chalcogen-containing-germanium, tin, or lead compositions, such as sub-stoichiometric, selenium (Se)-containing-germanium (Ge), tin (Sn), or lead (Pb) compositions useful in electrodes, particularly anodes, of rechargeable lithium ion batteries or sodium ion batteries. The present disclosure also relates to electrodes and rechargeable batteries containing such compositions, and methods of forming such compositions and methods for their use in electrodes and rechargeable batteries.

Sulfur has roughly half the atomic weight of selenium, so the use of sulfur in place of selenium in the compositions herein should herein could increase weight-based performance measures, such as gravimetric capacity.

Although the following discussion focuses on germanium-rich compositions, one of ordinary skill in the art, taking into account the known different electrochemical properties of semiconductors and metals and using the teachings of this disclosure, may apply the same discussion to compositions, anodes, or batteries containing tin or lead. Similarly, although the following discussion focuses on lithium ion batteries, one of ordinary skill in the art, taking into account the different ion sizes of lithium and sodium and using the teachings of this disclosure, may apply the same discussion to compositions and anodes for use in sodium ion batteries. For specific examples using either selenium or sulfur, one of ordinary skill in the art, using the known electrochemical properties of these and other chalcogens and the teachings of this disclosure, may develop similar compositions, anodes or batteries using other chalcogens, particularly selenium or sulfur. Furthermore, for the high C-rate electrodes described one of ordinary skill in the art, using the known electrochemical properties of these and the teachings of this disclosure, may develop electrolytic capacitors, Chalcogen-Containing-Germanium Compositions The active anode material may include a chalcogen, such as selenium (Se) or sulfur (S), in an amount between about 2 atom % and 25 atom %, for example between 2 atom % and 20 atom %, or between 5 atom % and 15 atom %, including 10 atom %.

The atom percent of chalcogen in a chalcogen-containing-germanium composition, particularly selenium-containing-germanium composition may be 25% or less, 20% or less, 15% or less, or 10% or less.

The germanium:chalcogen, particularly selenium, atom ratio may be between 80:20 and 98:2, particularly between 85:15 and 95:5.

One composition may have the exemplary chemical formula $Ge_{0.9}Se_{0.1}$ wherein the germanium to selenium atom ratio is about 9:1.

The germanium:chalcogen, particularly sulfur, atom ratio may be between 90:10 and 95:5. One composition may have the exemplary chemical formula Ge $Ge_{0.95}Se_{0.5}$, wherein the germanium to sulfur ratio is about 95:5. Another may have the exemplary formula $Ge_{0.9}Se_{0.1}$, wherein the germanium to sulfur ratio is about 90:10.

The compositions may be amorphous or substantially amorphous. The terms amorphous, non-crystalline and glassy are synonymous.

The compositions may be sub-stoichiometric.

After lithium insertion in the anode during the first cycle of an anode including a selenium-containing-germanium composition or a battery containing such an anode, the selenium-containing-germanium composition may form a mixture of non-cycling $Li_2Se$ and cycling Li—Ge alloys. The term alloy as used herein refers to a phase including at least two elements, such as Ge and Se, or Ge, Se and Li, or Ge and S, or Ge, S and Li. An alloy may be, for example, a semiconductor, a doped semiconductor, or a metal. The Li:Ge atom ratio in the cycling alloys is typically 22:5 or less.

A lithium selenide-based $Li^+$-conducting phase may be formed within the anode material during the first cycle. It will be understood by one of ordinary skill in the art using information reported herein, that after the first cycle or first few, typically fewer than 10 or 20, cycles of the anode during which an irreversible change may occur, for example because of the formation of a phase comprising a lithium-germanium alloy and $Li_2Se$, or formation of a microscopic mixture of a lithium-germanium alloy and $Li_2Se$ in the first cycle, there is little or no change in the chemical composition of the cycling anode material other than insertion of lithium upon charging and stripping of lithium upon discharging for 100 cycles or more, for example 200, 500, or 1000 cycles or more (i.e. the cycling anode material is chemically stable for the a given number of cycles or more). Similar Li—Ge alloys and a lithium chalcogen-based $Li^+$-conducting phase may be formed when other chalcogen-containing-germanium compositions are used, such as sulfur-containing-germanium compositions.

Chalcogen-containing-germanium compositions, particularly selenium-containing-germanium compositions or sulfur-containing-germanium compositions, such as those disclosed here, are suitable for electrodes, particularly anodes, in lithium ion batteries for a number of reasons. First, the lithium-stripping potential of such compositions is typically around 300 mV v $Li/Li^+$ allowing the battery to operate at a voltage loss of merely about 300 mV as compared to one with a metallic lithium anode. However, this potential is sufficiently different from the redox potential of lithium metal to greatly reduce the likelihood that lithium metal will form dendrites on the anode, as often occurs when lithium metal anodes are used. The formation of dendrites can constitute a hazard, for example a fire hazard, such that their avoidance may be a very important safety enhancement. Anodes and batteries as described herein may not form dendrites sufficient to reach the cathode or to otherwise cause battery failure for 100 cycles or more, for example 200, 500, or 1000 cycles or more.

Chalcogen-containing-germanium compositions, particularly selenium-containing-germanium compositions or sulfur-containing-germanium compositions, of the type disclosed herein also allow lithium ions to diffuse readily within the compositions, facilitating quick movement of lithium ions into and out of the material as electrons exit and leave. This facilitates other useful battery properties, such as high C-rate and high specific currents.

The term C-rate, as used herein means the inverse of the time it takes to charge or discharge the anode, the time being measured in hours. For example, 1 C rate means charging or discharging in 1 hour, 2 C rate means charging or discharging in ½ hour, 5 C rate means charging or discharging in $\frac{1}{5}^{th}$ of an hour 10 C means charging or discharging in 6 minutes, 100 C means charging or discharging in 36 seconds and 1000 C means charging or discharging in 3.6 seconds.

An anode containing particular selenium-containing-germanium compositions disclosed herein may exhibit at least a 1.2 Ah/g coulombic capacity and retain 70% of its capacity when charged at 50 C rate, and 40% of its capacity when charged at 100 C rate, i.e. when it is lithiated in 36 seconds. After 1000 cycles at 50 C rate the material may retain at least 70% of its maximum observed capacity. Its rate of discharge may be even faster: When discharged at a rate as high as 1100 C, i.e. in 3.3 seconds, at least 75% of the coulombic capacity may be retained. At this rate the specific current may be at least 1.34 kA/g. When discharged at 1800 C rate, the composition may still retain at least 36% of its 1.2 Ahr/g capacity. The material may support specific currents up to 1800 C (2200 A/g). In addition to performing well at high rates, an anode formed using a selenium-containing-germanium composition described herein may be stable over 1000 cycles at 50 C rate.

An anode containing particular sulfur-containing-germanium compositions disclosed herein may exhibit at least a 1.0 Ah/g coulombic capacity and retain at least 89% of its capacity when charged or discharged at 10 C rate, 70% of its capacity when charged or discharged at 50 C rate. In addition to performing well at high rates, an anode formed using a sulfur-containing-germanium composition described herein may be stable over 300 cycles or even 500 cycles at 20 C rate.

Methods of Forming Chalcogen-Containing-Germanium Compositions

Sub-Stoichiometric, chalcogen-containing-germanium compositions, particularly sub-stoichiometric, selenium-containing-germanium compositions or sulfur-containing-germanium compositions, of the present disclosure may be formed by any means suitable for growing such materials, including methods used in the semiconductor and electronics industries.

For example, sub-stoichiometric, porous, nanocolumnar selenium-containing-germanium thin films may be formed by glancing angle deposition (GLAD), with the atoms impinging on the substrate at an oblique angle. The deposition angle may be, for example, between 40° and 85° versus normal to the surface, such as between 60° and 75° versus normal including about 70° versus normal. GLAD may provide nanocolumnar films if the surface diffusion is limited. The roughness created in the early stages of deposition may be amplified by self-shadowing. In GLAD, the morphology of the film may be tuned by varying the deposition angle. Dense films are grown when the deposition angle is close to the surface normal while nanocolumnar films are grown at more oblique angles. Other deposition methods are known and include, for example, thermal evaporation, e-beam evaporation and sputtering, from one or more source or target.

Although GLAD results in porous nanostructured materials, if other deposition or formation techniques are used, larger, microstructured materials may be obtained. These materials may be used in that form or may be further processed, for example by milling or grinding, to reduce them to nanometer size in at least one dimension.

Sulfide thin films may be formed in the same manner.

In another example, sub-stoichiometric selenium-containing-germanium particles may be formed by heating germanium and selenium pieces in a low pressure-low oxygen, or oxygen-free environment until molten and mixed, then quenching them after a germanium sub-selenide material has formed. Typically, the mixture may be held in a molten state, such as at least 1050° C., for at least twelve hours. The mixture may also be mixed during this time, for example by rotation. The resulting quenched particles may further be jet-milled or otherwise broken down to a desired size, such as nanometer size. This process may be sensitive to how rapidly quenching occurs. If too much material is present for quenching to be rapid, then material formation may be harmed. Germanium sub-sulfide particles may be formed in the same manner.

Anodes and Lithium Ion Batteries Including Chalcogen-Containing-Germanium Compositions The present disclosure additionally relates to an anode 20, which may be included in a rechargeable lithium ion battery 10. Lithium ion battery 10 may also include a cathode 30 and an electrolyte 40 as shown in FIG. 1. Battery 10 may additionally include separator 50. Battery 10 may contain contacts 60, which facilitate connection to an external device 70, which may be powered by the battery or which may recharge the battery.

Anodes may be formed using sub-stoichiometric chalcogen-containing-germanium compositions, particularly selenium-containing-germanium compositions or sulfur-containing-germanium compositions, as described herein as an electrochemically active anode material. The electrochemically active anode material may include any material capable of alloying, intercalating, combining, or reacting with lithium or lithium ions. Other anode materials, which may be electrochemically active, may also be included in the active anode material or as an additional active anode material. After the first charge-discharge cycle, the active anode material may include a Li—Ge or Li—Ge-chalcogen alloy as described above. After the first charge-discharge cycle, the active anode material may additionally include non-cycling $Li_2Se$ or other non-cycling lithium-chalcogen material.

Excluding any less electrochemically active or electrochemically inactive conductors such carbon and polymeric binders, the active anode material may include at least 80 atom % Ge, for example between about 80 atom % and 98 atom % Ge, such as between 85 atom % and 95 atom % Ge, including 90 atom % Ge.

It will be understood by one of skill in the art that the active anode material may contain more or less lithium depending on the state of charge of the anode or a battery containing the anode.

The active anode material may be provided on a current collector. The current collector may be, for example, made of aluminum, copper or stainless steel. Additional materials such as an electronic conducting material or a binder may be included in the anode. For example, they may be mixed with the active anode material to form a composite anode material.

The electronic conducting material may include a non-electrochemically active or less-electrochemically active electron or hole conductor such as carbon, for example, carbon black, acetylene back, graphite, or carbon nanotubes. However, the high electrical conductivity of the active anode material may reduce the need for conducting carbon additives, thus increasing the energy and power density of the anode.

The binder may also be less electrochemically active or electrochemically inactive. The binder may include a polymer such as polyacrylonitrile (PAN), polyvinylidene fluoride (PVDF), polyvinylpyrrolidone (PVP) or polymethylmethacrylate (PMMA).

The composite anode material may contain from 50 to 85 wt %, specifically from 60 to 75 wt % of chalcogen-containing-germanium, particularly selenium-containing-germanium or sulfur-containing-germanium.

A film containing an amorphous chalcogen-containing-germanium may be formed by applying a paste to a current collector, typically a metal, such as copper or stainless steel. The paste may include particles of chalcogen-containing-germanium, particularly selenium-containing-germanium or sulfur-containing-germanium, with at least one dimension on average smaller than 5 μm, for example less than 0.5 μm, 1 μm, 200 nm, 100 nm or 50 nm. The paste may include an electronically conducting material, such as a carbon, or a binder, typically a polymer. The weight % of the electronically conducting material in the dry film formed from the paste may be less than 30 weight %, for example less than 20 weight % or less than 10 weight %. The weight % of the binder may be less than 25 weight %, for example less than 15 weight % or less than 5 weight %. The film may be applied, for example, by printing, dipping or spraying.

A lithium ion secondary battery may contain a cathode, which may include a composite cathode material on a current collector. The current collector may be, for example, made of a copper foil or an aluminum foil. The composite cathode material may contain an active cathode material including a compound that allows reversible insertion of lithium ions at a potential more oxidizing than that of the anode. The composite cathode material may also contain an electronic conducting agent or a binder. The electronic conducting agent and the binder may be selected from those mentioned for the anode. The active cathode material may be selected from transition-metal oxides able to provide a host framework into which lithium ion may be reversibly inserted and extracted. For example, the active cathode material may include a lithium metal oxide, such as $LiCoO_2$ and $LiMn_{1.5}Ni_{0.5}O_4$, a lithium metal polyanion oxide, such as $LiFePO_4$ or other phosphates, sulfonates, vanadates, or arsenates, oxygen, a peroxide, such as a $Li_2O_2$, sulfur, a sulfur-polymers, a sulfoselenides, and any other known or later discovered sodium material for which a compatible electrolyte and suitable voltage may be obtain with an anode as described herein. Also for example, the cathode material may have a planar, olivine, spinel, or rhombohedral nasicon structure.

For sodium ion batteries, suitable active cathode materials include $Na_2FePO_4F$, $NaVPO_4F$, $NaV_{1-x}Cr_xPO_4F$, $Na_xVO_2$, $Na_4Fe(CN)_6$, $Na_{1.5}VPO_{4.8}F_{0.7}$, P2-$Na_{x[Ni1/3Mn2/3]}O_2$, wherein (0<x<⅔), sodium-rich layered oxides, and any other known or later discovered sodium material for which a compatible electrolyte and suitable voltage may be obtain with an anode as described herein.

Cathodes and anodes may combine more than one type of active material.

The battery may also contain an electrolyte, such as a liquid or a gel in which a lithium salt is dissolved and in which the salt at least partly dissociates to at least one cation and at least one anion. Typically the electrolyte contains an organic liquid having, for example, carbonate, ether, nitrile or sulfoxide functions. In certain embodiments, the lithium salt may be selected from lithium salts conventionally used in lithium ion secondary batteries. Examples of anions of the lithium salt include perfluoroalcanesulfonates, bis(perfluoroalkylsulfonyl) imides, perchlorate $(ClO_4)^-$, hexafluorophosphate $(PF_6^-)$, hexafluoroarsenate $(AsF_6^-)$ or tetrafluoroborate $(BF_4^-)$. The liquid solvent may include an organic liquid, such as a carbonate, particularly an organic carbonate, an ether, a nitrile or sulfoxide, or another ionic liquid. Examples of organic carbonates include propylene carbonate, ethylene carbonate, and dialkyl carbonates (such as cyclic ethylene carbonate, cyclic propylene carbonate, dimethylcarbonate, diethylcarbonate and methylpropylcarbonate). The polymer may include a polar polymer selected from solvating, crosslinked or non-crosslinked polymers. A solvating polymer may include a polymer that contains solvating units containing at least one hetero atom chosen from sulfur, oxygen, nitrogen and fluorine. Example solvating polymers include polyethers of linear, comb or block structure, forming or not forming a network, based on poly(ethylene oxide), or polymers containing the ethylene oxide or propylene oxide or allyl glycidyl ether unit, polyphosphazenes, crosslinked networks based on polyethylene glycol crosslinked with isocyanates or networks obtained by polycondensation and bearing groups that allow the incorporation of crosslinkable groups. In another embodiment, the electrolyte may be a solid electrolyte, particularly one with high ionic conductivity such as a graft co-polymer or nanoporous $\beta\text{-}Li_3PS_4$.

For sodium ion batteries, the equivalents of materials described above for lithium salts, but with sodium in place of lithium, may be used. In particular, propylene carbonate, ethylene carbonate, and dimethylcarbonate, along with a sodium ion or sodium ion source, may be used alone or in combination.

Electrolytes may combine more than one type of electrolyte material.

Batteries of the present disclosure may be as simple as single electrochemical cells. They may also include multiple-cell arrangements, such as multiple cells arranged in series or in parallel. Cell arrangement may be designed to achieve particular parameters for a battery, such as a particular voltage. Batteries may also include regulatory components, such as safety monitors, cut-off switches, fire suppressants, detectors and monitors. In one embodiment, a battery may include a computer.

Batteries may be used in a variety of devices, including, but not limited to, cell phones, smart phones, computers, handheld electronic devices, automobiles, including cars, trucks, buses, motorcycles, and powered bicycles, watercraft, including boats and jet-skis, power tools and power tool battery packs, backup power sources, including portable backup power sources, battery-powered medical devices and equipment, and grid storage systems.

Batteries with anodes containing sub-stoichiometric, chalcogen-containing-germanium, particularly selenium-containing-germanium or sulfur-containing-germanium, may be charged at rates faster than 20 C, for example faster than 50 C, or faster than 100 C, i.e. they may be charged in 3 minutes or less, 1.2 min or less or 36 seconds or less while retaining a capacity of at least 1 Ah/g. These batteries may also be discharged at rates faster than 60 C, 120 C, 300 C, 600 C, 1000 C or 1500 C including 1800 C, i.e. in less than 1 minute, 30 seconds, 12 seconds, 3.6 seconds, 2.4 seconds including 2 seconds while retaining a capacity at least 0.5 Ah/g. The batteries may be charged or discharged at a rate of C/5 while retaining a capacity of at least 0.9 $mAh/cm^2$ or at a rate of 2 C while retaining a capacity of 0.7 $mAh/cm^2$.

Capacitors Containing Chalcogen-Containing-Germanium Compositions

Any of the chalcogen-containing compositions described herein may also be used as an active material in electrodes of capacitors. In particular, sulfur or selenium-containing germanium compositions may be used. When the electrodes contain a germanium selenide, the germanium:selenium ratio may be greater than 4. The electrodes may further contain binder and support materials as appropriate and in a manner similar to anodes described above. The capacitors may include super or ultra capacitors. The capacitor may contain two electrodes both made of the same or similar material. Upon charging, an ion, such as lithium or sulfur, may be enriched in the active material in one electrode and depleted in the other.

The capacitor may have any suitable form, but typically will include two electrodes that are electrically insulated from one another by a separator. To charge the capacitor, the electrodes are connected to a source able to establish a potential between then. If the charged electrodes are then electrically connected, current will flow through the electrical connection, for example powering a device, until the potential of both electrodes is the same, or nearly the same. Capacitors may also be used to control current flow and to filter some types of current, such as direct current.

EXAMPLES

The present invention may be better understood through reference to the following examples. These examples are included to describe exemplary embodiments only and should not be interpreted to encompass the entire breadth of the invention.

Example 1—Germanium Selenide Material Synthesis and Characterization $GeSe_2$ was synthesized from its component elements (Germanium, 99.999% from Kurt J Lesker, and Selenium 99.999% from Alfa-Aesar) by heating to 1000° C. in a sealed quartz tube. The resulting material was a mixture of crystalline and amorphous $GeSe_2$ as determined by XRD and EDX. $Ge_{0.9}Se_{0.1}$ anodes, also denoted here as $GeSe_{0.1}$ anodes, were vacuum deposited by diluting thermally evaporated $GeSe_2$ with additional germanium from a second evaporation source. Material was deposited on 15.6 mm diameter stainless steel substrates (Pred Materials) at an incident angle of 70° from surface normal. The substrates were cleaned by sonication in ethanol prior to deposition. The deposition rate of each evaporator was calibrated using a quartz crystal microbalance (Inficon), and the mass density of the anodes was 50 $\mu g/cm^2$.

SEM images of the anodes were obtained with a Hitachi S5500 microscope. EDX spectra were obtained with a Bruker detector on the same instrument. XRD was performed on a Bruker D8 powder x-ray diffractometer. Resistivity measurements were made with a Lucas four-point probe employing a Keithley 220 programmable current source.

As-deposited films were assembled into 2032 coin cells in an argon-filled glove-box (MBraun Unilab) with oxygen and water levels held below 5 ppm. Lithium metal (Alfa Aesar 99%) was used as the counter/pseudoreference electrode and 1 M LiPF$_6$ (Sigma Aldrich, battery grade) in a 1:1 mixture of fluorinated ethylene carbonate (Solvay Chemicals) and diethyl carbonate (Sigma Aldrich, battery grade) was the electrolyte. Cells were galvanically cycled using an Arbin BT2043 multichannel battery tester. Cells were cycled between 5 mV and either 1.5 V or 2V versus Li/Li$^+$.

Example 2—Morphological and Chemical Analysis of Germanium Selenide

Figure 2A:
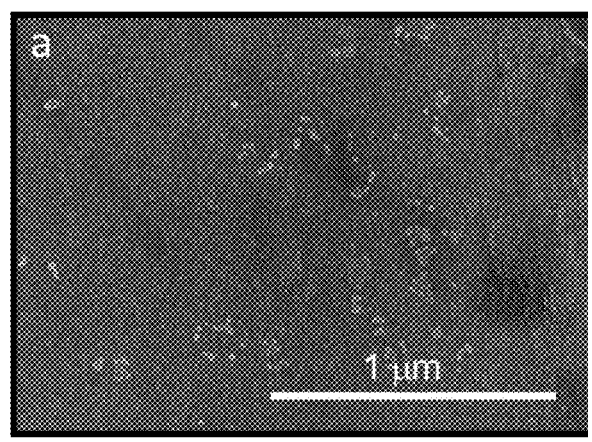
FIGS. 2A-2D depict the morphological and chemical analysis of a $Ge_{0.9}Se_{0.1}$ electrode.
Figure 2B:
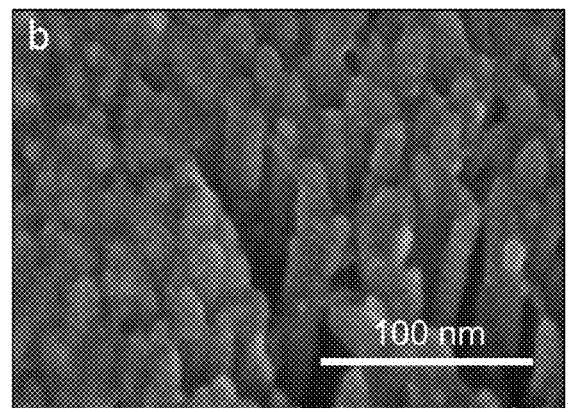

Scanning electron microscope (SEM) images of a Ge$_{0.9}$Se$_{0.1}$ film deposited at 70° versus normal are shown in FIG. 2A and FIG. 2B. The film was a close-packed forest of nanocolumns of 10-15 nm in diameter. The spaces between the individual columns were able to accommodate the large volume expansion during lithium insertion and the nanocolumnar films are well retained on their stainless steel substrates. In contrast, dense films deposited normally to the surface become delaminated upon cycling.

Figure 2C:
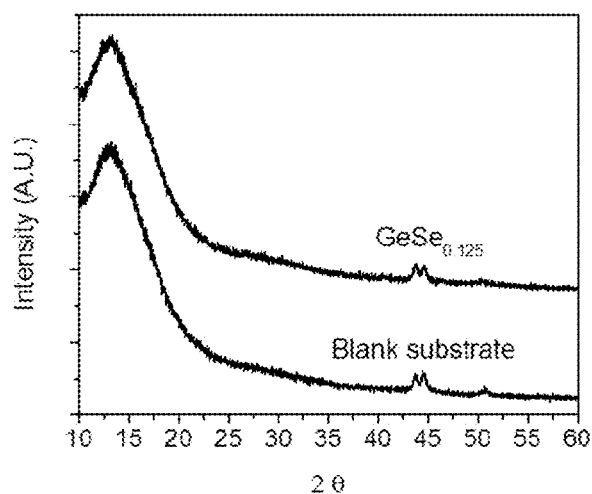
Figure 2D:
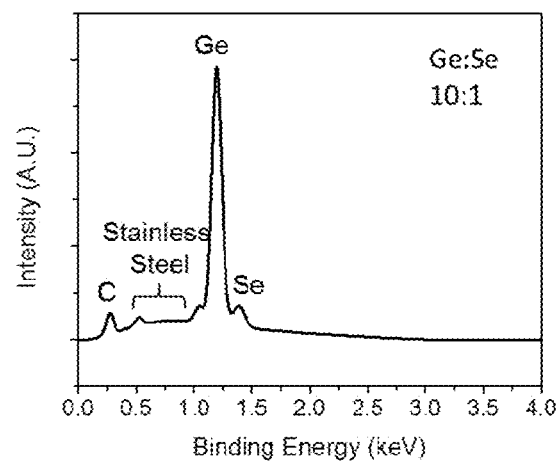

FIG. 2C shows that the nanocolumnar film is amorphous, i.e., that its x-ray diffraction pattern is featureless. Nanocolumnar GLAD films tend to be amorphous because the formation of long-range order relies upon adatom mobility while the growth of nanocolumnar features relies upon limited surface diffusion. The energy dispersive x-ray spectrum (EDS) of the film (FIG. 2D) shows that its germanium:selenium ratio is 10:1, which is close to the nominal value. The lesser EDS carbon, iron, nickel and chromium peaks derive from the stainless steel substrate upon which the film is deposited.

Example 3—Electrochemical Analysis of Germanium Selenide

The electrical resistivity of a dense Ge$_{0.9}$Se$_{0.1}$ film evaporatively deposited at normal incidence on glass as measured by four-point probe measurements was ~50 ohm/cm, less than the 100 ohm/cm resistivity measured for amorphous evaporated germanium and much less than the 1.4×10$^5$ ohm/cm resistivity for amorphous silicon, two well-studied, high-capacity lithium-ion battery electrode materials. Electrode resistance contributes to the overpotential required to charge a battery at a given rate; therefore low resistivity is advantageous for high-rate electrode materials.

Coin cells that had nanocolumnar Ge$_{0.9}$Se$_{0.1}$ working anodes and metallic lithium counter-electrode were used to test electrochemical properties. Assuming that only germanium contributes to the reversible capacity, the calculated specific capacity of the films is 1.25 Ah/g. The rate capabilities of the structurally similar nanocolumnar pure Ge and Ge$_{0.75}$Se$_{0.25}$, also GLAD deposited at 70° vs. normal were poorer than those of Ge$_{0.9}$Se$_{0.1}$.

Figure 3A:
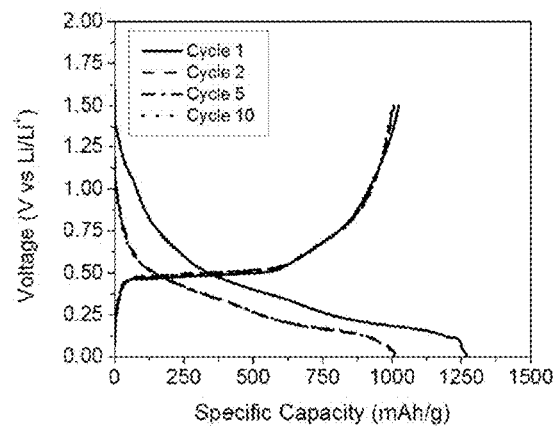
FIGS. 3A-3D depict electrochemical analysis of $Ge_{0.9}Se_{0.1}$ electrodes.
Figure 3B:
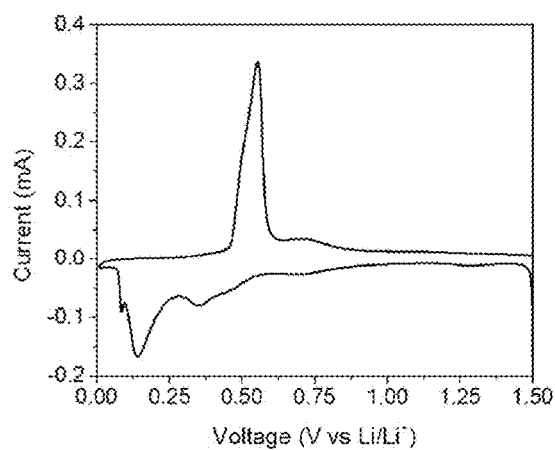

FIG. 3A shows the voltage profiles for the first, 2$^{nd}$, 5$^{th}$ and 10$^{th}$ cycles at a slow, C/10, rate. In the first cycle Li-insertion step, the Ge$_{0.9}$Se$_{0.1}$ alloy is converted to a mixture of non-cycling Li$_2$Se and a series of cycling Li—Ge alloys. Of these, LiGe, Li$_9$Ge$_4$, Li$_{16}$Ge$_5$, and Li$_{22}$Ge$_5$ were reported to persist at 400° C., where their reversible potentials in molten LiCl—KCl are between 62 mV and 580 mV vs. Li/Li$^+$. As seen in the 25° C., 0.1 mV/s voltammogram of FIG. 3B, this range is well overlapped by the Li alloying peaks and shoulders at 0.08 V, 0.14 V, 0.33 V and 0.46 V and the de-alloying broad peak at 0.63 V and shoulder at 0.50 V. The first cycle lithium insertion profile shows a broad sloping region between 1 V and 0.5 V, attributed to non-cycling Li$_2$Se and SEI formation; below 0.5 V, the profile shows multiple broad pseudo-plateaus consistent with the expected staged lithiation of amorphous germanium, including a small plateau at 100 mV consistent with that expected for crystalline Li$_{1.5}$Ge$_4$. A flat lithium extraction plateau seen only at very slow rates suggests a slowly crystallizing lithiated germanium phase.

Figure 3C:
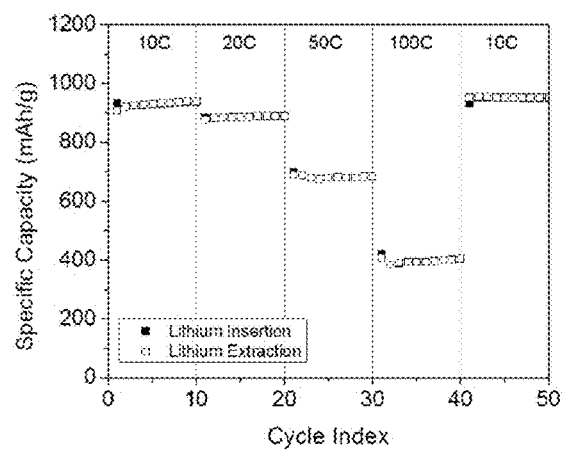
Figure 3D:
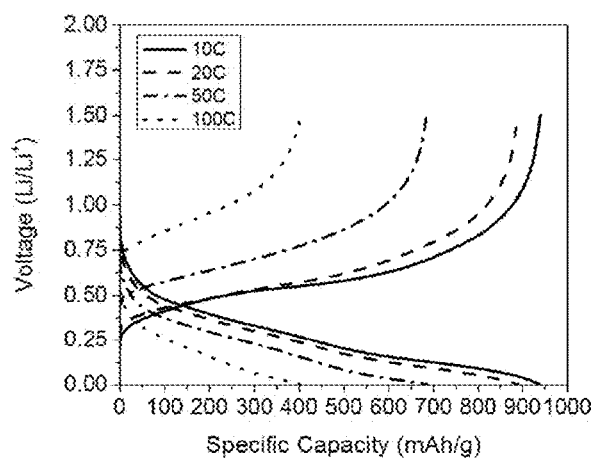

FIG. 3C shows the cycling of a Ge$_{0.9}$Se$_{0.1}$ anode for 10 cycles each at 10 C, 20 C, 50 C and 100 C rates. While the material is stable at these rates, the retained capacity drops at 50 and 100 C, ~70% of the 1 C capacity being retained at 50 C and ~40% at 100 C. As seen in the 10$^{th}$ cycle voltage profiles at each rate (FIG. 3D), lithium insertion is slower than its extraction, as all inserted lithium is removed well before the upper cutoff voltage is reached. This is as expected for the rate limiting step being stripping of the Li$^+$ solvation shell or its diffusion through the SEI layer.

Figure 4:
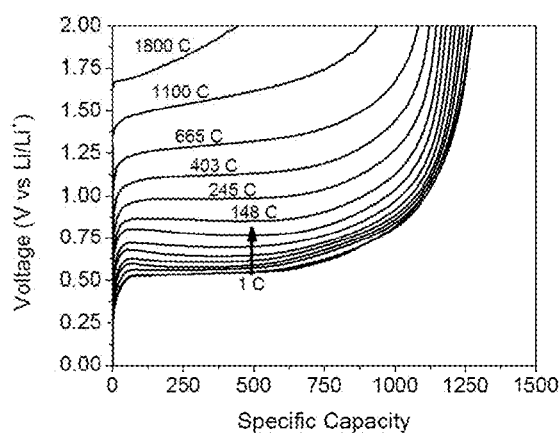
FIG. 4 shows electrochemical stripping at various rates.

To examine the discharge profile (FIG. 4), a Ge$_{0.9}$Se$_{0.1}$ anode was lithiated at 1 C and the delithiated at rates ranging 0.1 C to 1800 C up to a voltage cutoff of 2V. As the rate is increased, the lithium stripping voltage increases, but the capacity is little-affected up to 400 C rate, where 87% of the capacity is retained; at an 1100 C rate, 75% is retained and 0.94 Ahr/g is discharged in 2.5 seconds; at an 1800 C rate, 36% of the capacity is still retained. The well-retained capacity at high rates is indicative of fast lithium transport in the solid state. The polarization at the lithium counter electrode is necessarily included in the increased lithium stripping voltage at high rates due to the use of two-electrode coin-cells in this test.

Figure 5:
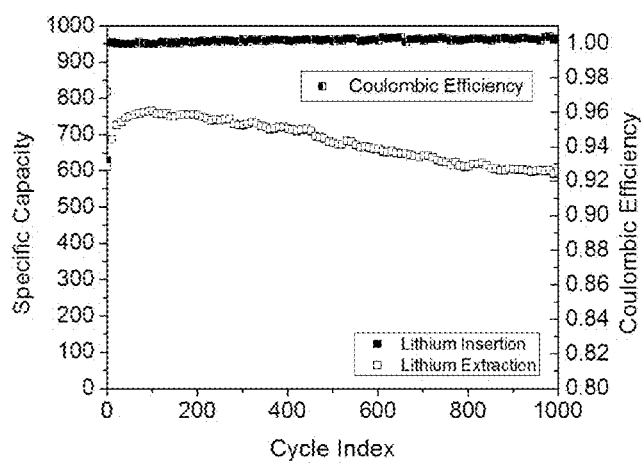
FIG. 5 shows cycle life testing of a $Ge_{0.9}Se_{0.1}$ electrode.
Figure 6:
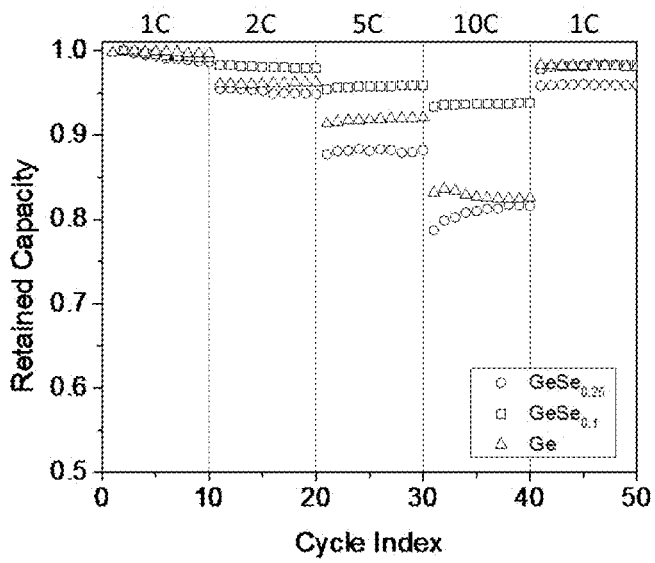
FIG. 6 shows a comparison of Ge, $Ge_{075}Se_{0.25}$ (designated $GeSe_{0.1}$) and $Ge_{0.9}Se_{0.1}$ (designated $GeSe_{0.25}$) electrodes cycled at rates up to 10 C.

Specific capacity versus cycle number for a Ge$_{0.9}$Se$_{0.1}$ anode cycled at 50 C for 1000 cycles was also tested (FIG. 5). The capacity increased over the first 100 cycles because of ohmic heating of the coin cell during testing. After 1000 cycles ~70% of the maximum observed capacity was retained. The coulombic efficiency remained unity throughout the 1000 cycles, and since charge is consumed during SEI formation, the high coulombic efficiency is an indication of a stable SEI layer.

Example 4—Comparison of Selenium-Containing-Germanium Anodes and Germanium Anode Retained capacity versus cycle at rates up to 10 C were measured using coin cells as described in Example 3. Anodes in these coin cells contained Ge$_{0.9}$Se$_{0.1}$ or pure Ge or Ge$_{0.75}$Se$_{0.25}$, also GLAD deposited at 70° vs. normal and exhibiting a nanocolumnar structure. Performance for these alternative anodes was poorer than that of Ge$_{0.9}$Se$_{0.1}$.

Example 5—Formation of Germanium Selenide Particles

Germanium sub-selenide micron-sized particles were synthesized by combining millimeter-sized pure germanium and pure selenium pieces in a ratio of 9:1 Ge:Se in a quartz ampule that was closed at one end. Too much material in the ampule should be avoided, as it results in inadequate quenching and a non-homogenous mixture. In this example, a 12 mm OD, 8 mm ID tube that was 12 inches in length was successfully used with 10 g total material. The tube was evacuated using a vacuum to around $10^{-5}$ Torr and closed, then an oxy-acetylene torch was used to close and completely seal the tube, holding the germanium and selenium under high vacuum in a nearly oxygen-free environment. The sealed tube was placed in a tube furnace and heated to approximately 1050° C. at a rate of around 10° C./min, until the mixture appeared to be molten. The sealed tube was then held at 1050° C. for over 24 hours while being rotated at 30 rpm or more. The phase diagram for germanium and selenium is uncertain at this temperature, so although a single liquid phase appeared to exist, rotation was used to ensure homogenous distribution of the two elements. The mixture appeared to need to be held at 1050° C. for at least twelve hours.

The tube was placed in a water bath to quench. It is preferred that quenching be rapid enough to preserve the single, homogenous phase of germanium and selenium.

Figure 7:
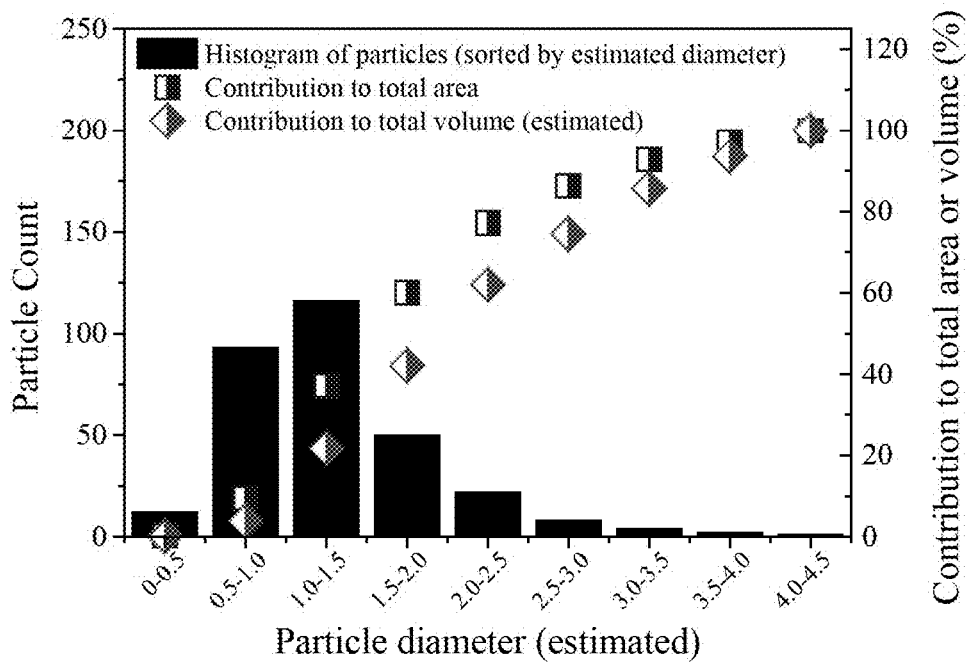
FIG. 7 shows the analysis of more than 300 particles within a grid as characterized by SEM and analysed using the Image J software for particle size determination.

After quenching, the tube was opened and the contents were broken up with a mortar and pestle and fed into a jet mill at a rate or 10/g·hr. The mill pressure was 120 psi $N_2$·10. The resulting particles were micron size, primarily between 1 and 3 microns, as shown in FIG. 7.

Ball milling was also attempted using 3 mm $Y—ZrO_2$ medium. Particles formed in this manner have less uniform size as compared to jet-milled particles and contained contaminants.

Example 6—SEM and Electrochemical Analysis of Germanium Selenide Particles

Figure 8:
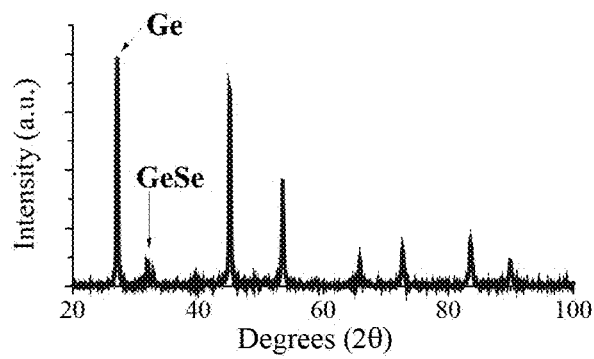
FIG. 8 shows the powder x-ray diffraction spectrum of germanium sub-selenide particles which are mixture of germanium and germanium mono-selenide crystalline phases.
Figure 9:
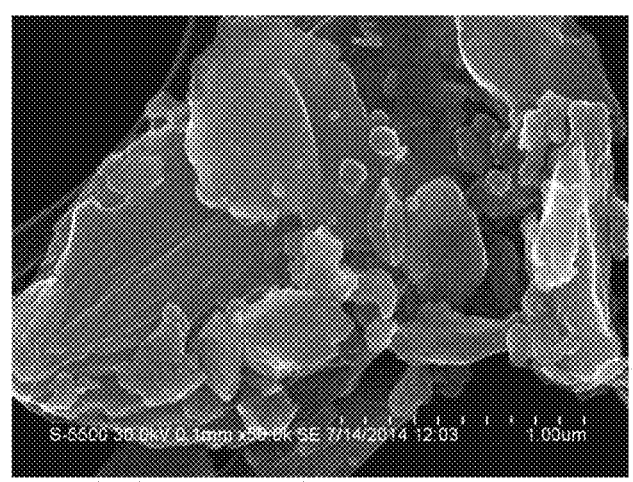
FIG. 9 shows the morphology of jet milled germanium sub-selenide particles as characterized by SEM.

Particles formed in Example 5 were characterized in terms of chemical composition by EDS analysis and in terms of size by SEM. EDS line scans conducted over 100 micrometers distance, characterizing many particles, indicated that the stoichiometry of Ge:Se was 88.9:11.1 with an error of 1.1. These quenched and milled particles were found to contain crystalline domains of both Ge and GeSe (each of about 30 nm average size, as determined by analysis of the FWHM of powder x-ray diffraction, FIG. 8). Analysis of the outlines of over 300 particles within a grid section being characterized by secondary electron microscopy (SEM) indicated that the majority of particles had a diameter (defined as twice the square root area of the outlined particle divided by pi) of about 1 micron or more. (FIG. 7). As a consequence, the vast majority of the charge/discharge measured in electrochemical experiments with these particles can be attributed to particles of microns-size. A SEM of the morphology of the jet milled particles is shown in FIG. 9.

Figure 10:
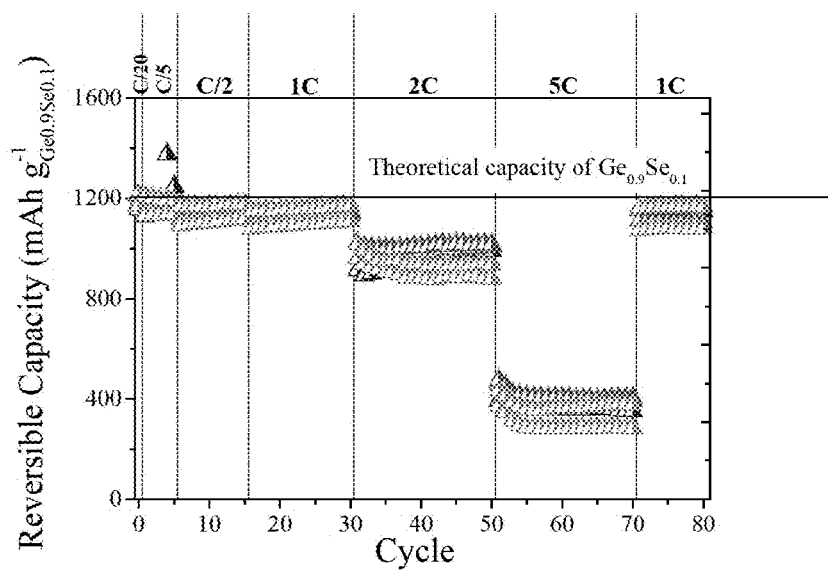
FIG. 10 shows cycling results for several nominally identical germanium sub-selenide electrodes at variable rates. 1 C is defined as a charge or discharge occurring 1 time per hour (a rate of 2 C indicates a rate of 1 charge or discharge per 30 minutes). The theoretical capacity of $Ge_{0.9}Se_{0.1}$ is indicated by the dark black line at 1205 mAh/g.

Electrodes were formed using an aqueous slurry of 80 wt % germanium selenide particles, 10 wt % carboxymethyl cellulose binder, and 10 wt % Super-P Li conductive additive. The slurry was cast upon a copper substrate with an active material mass loading of 0.75 mg/cm$^2$. The capacity of these electrodes was from 0.9 to 0.7 mAh/cm$^2$ cycling from, respectively, C/5 to 2 C. (FIG. 10.)

Example 7—Germanium Sulfide Synthesis and Characterization

Sub-stoichiometric germanium sulfide electrodes were vacuum deposited by diluting thermally evaporated $GeS_2$ (MP Biomaterials) with additional germanium (99.999% pure) from a second evaporation source. The deposition rates of Ge and $GeS_2$ could be independently controlled, so films with arbitrary sulfur content could be deposited. A thermal evaporator was use to evaporate $GeS_2$ from an alumina crucible while an electron beam evaporator was used to evaporate Ge from a carbon crucible. Material was deposited on 15.6 mm diameter stainless steel substrates (Pred Materials) at an incident angle of 0° or 70° from the surface normal. The substrates were cleaned by sonication in ethanol prior to deposition. The deposition rate of each evaporator was calibrated using a quartz crystal microbalance (Inficon), and the mass density of the electrodes was 50 µg/cm$^2$.

XRD was performed on a Philips XPERT thetatheta diffractometer. XPS was performed using a commercial X-ray photoelectron spectrometer (Kratos Axis Ultra), utilizing a monochromatic Al—Kα X-ray source (hv=1486.5 eV). An automated charge neutralizer was employed for analysis. The surface of each sample was cleaned by argon ion sputtering before analysis in order to remove any surface oxide, contamination, or solid electrolyte interphase (SEI) layer formed during cycling. The surface was sputtered in one minute intervals until the oxygen is (for oxide layer) and fluorine 1s (for SEI layer) signals were removed. Casa XPS analysis software was used to determine the stoichiometry of samples from corrected peak areas. Sensitivity factors, either provided by Kratos or determined experimentally, were employed for each element of interest. The binding energies were calibrated to the C 1s signal from adventitious carbon taken to be 284.8 eV.

Figure 11:
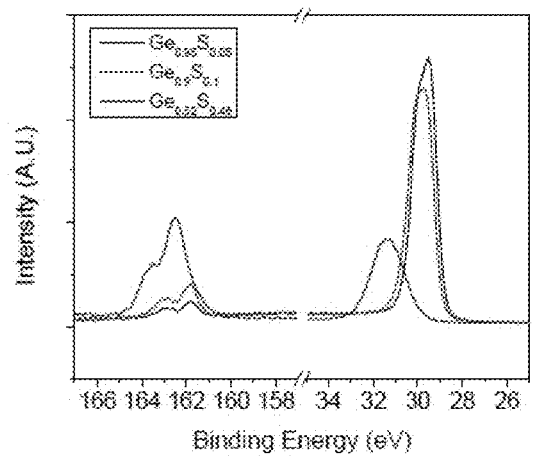
FIG. 11 shows the Ge 3d and S2p XPS features of sub-stoichiometric germanium sulfide deposited at 0° on stainless steel substrates.

Evaporation of only $GeS_2$ led to the deposition of a severely sulfur deficient film, so film compositions were correlated to deposition rates by x-ray photoelectron spectroscopy (XPS). Dense films for XPS analysis with various sulfur content were deposited at 0° from surface normal. Evaporation of only $GeS_2$ resulted in films with a composition of $Ge_{0.52}S_{0.48}$ as measured by XPS. The low sulfur content of the deposited film is likely due to decomposition of the $GeS_2$ during evaporation. A fraction of the free sulfur created by the decomposition of GeS2 would re-evaporate from the film's surface rather than being incorporated into the film during deposition. Knowing the amount of sulfur incorporated into films deposited from evaporation of the $GeS_2$ precursor allowed the deposition of films with controlled sulfur content, and films with 5 or 10 at % sulfur were grown. The germanium 3d and sulfur 2p XPS features of films with 5, 10, or 48 at % sulfur are shown in FIG. 11. These features were used for compositional analysis of each film. The position of the Ge 3d peak is seen to shift to higher binding energies as the sulfur content of the film is increased. This is consistent with sulfur drawing electron density away from the germanium atoms in the film. At the same time, the intensity of the feature decreases due to the lower concentration of germanium atoms at the surface while the sulfur 2p doublet increases in magnitude.

Figure 12A:
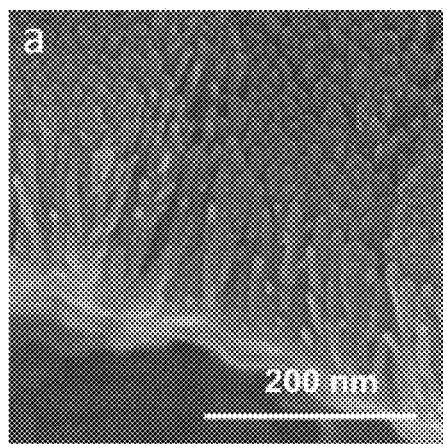
FIG. 12A shows an SEM image of 70° $Ge_{0.9}S_{0.1}$.
Figure 12B:
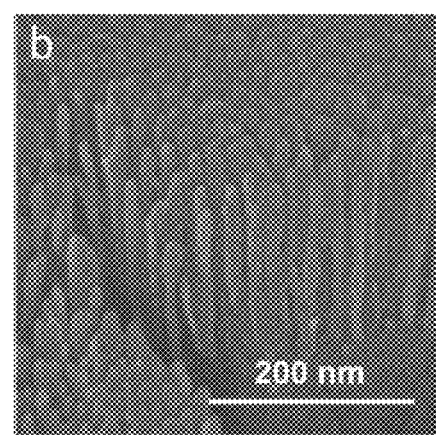
FIG. 12B shows an SEM image of 70° Ge film. Both films show nanocolumnar morphology with a column diameter of approximately 10 nm.

SEM images of the electrodes were obtained with a Hitachi S5500. SEM images were analysed using ImageJ. EDS was performed with a Bruker detector on the same instrument. An SEM image of $Ge_{0.95}S_{0.05}$ deposited at 70° is shown in FIG. 12A. The films are nanocolumnar, with an average column diameter of ~10 nm. The nanocolumnar morphology helps accommodate large strains that accompany the volumetric expansion that occurs during lithiation. Additionally, a nanoscale dimension decreases the lithium diffusion length, and facilitates rapid lithium transport. The morphology of the $Ge_{0.95}S_{0.05}$ films is very similar to that of the pure germanium films shown in FIG. 12B, so the differences in electrochemical performance can be attributed to the presence of sulfur in the films. The morphology of the film also did not change significantly when the sulfur content was increased to 10 wt %.

Figure 13:
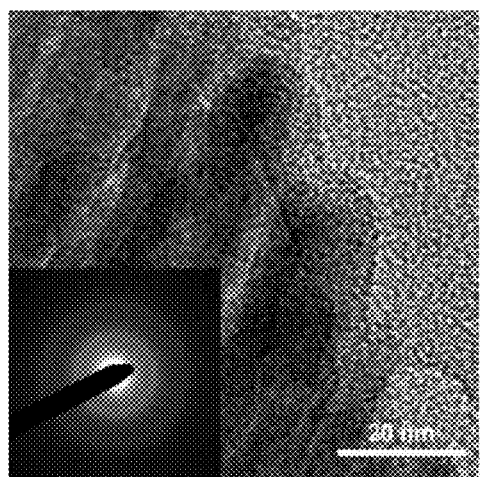
FIG. 13 shows TEM and SAED (insert) images of as-deposited films of $Ge_{0.95}S_{0.05}$.

TEM imaging and electron diffraction were performed on a JEOL 2010F. Samples for TEM were deposited on 10 µm thick copper foil. The TEM samples were prepared by ultramicrotome sectioning of resin-embedded electrodes. TEM of an as-deposited $Ge_{0.95}S_{0.05}$ film is shown in FIG. 13. The TEM perspective is of an approximately 50 nm thick cross-section of the thin film. The TEM image confirms the small, approximately 10 nm column diameter shown by SEM, and high resolution TEM characterization also shows the material to be amorphous, with no lattice fringes visible in the images. Additionally, based on the selected area electron diffraction (SAED) pattern from the sample, only diffuse rings are present in the diffraction pattern, further indicating that the material is amorphous. The generally amorphous nature of the as-deposited films is expected. The growth of long-range ordered crystalline films requires surface diffusion during deposition to allow adatoms to migrate to the equilibrium lattice points but the formation of nanocolumns during film deposition requires that adatom mobility be limited. The ability of nanocolumns to form during deposition suggests the film will be amorphous. X-ray diffraction (XRD) was also performed on an as deposited sample. No diffraction peaks from the film were observed, confirming the amorphous nature.

Example 8—Electrochemical Analysis of Germanium-Sulfide

Films formed according to Example 7 above were assembled into 2032 coin cells in an argon-filled glove-box (MBraun Unilab) with oxygen and water levels held below 5 ppm. Lithium metal (Alfa Aesar 99%) was used as the counter/pseudoreference electrode and 1 M $LiPF_6$ (Sigma Aldrich, battery grade) in a 1:1 mixture of fluorinated ethylene carbonate (Solvay Chemicals) and diethyl carbonate (Sigma Aldrich, battery grade) as the electrolyte. A 25 µm thick polypropylene film separator (Celgard 2400) was used. Cells were galvanically cycled using an Arbin BT2043 multichannel battery tester. Cells were cycled between 5 mV and 1.5 V versus $Li/Li^+$.

Figure 14A:
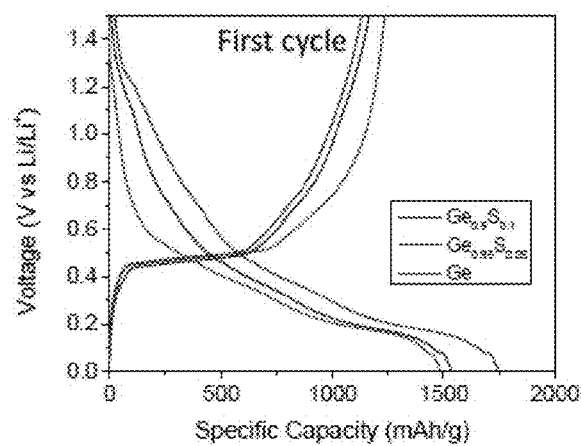
FIGS. 14A-14D show voltage profiles of various films deposited at 70° from surface normal.

The electrochemistry of sub-stoichiometric germanium sulfide was investigated by galvanostatic cycling. C-rates for the sulfur containing films were calculated by assuming that only the germanium in the film contributes to the reversible capacity, but the specific capacity of the electrodes was calculated using the entire mass of the film (germanium plus sulfur). The first cycle voltage profiles of $Ge_{1-x}S_x$ films, as well as pure germanium films are shown in FIG. 14A. This cycle was performed at a rate of C/10. The first cycle lithium insertion capacity for $Ge_{0.9}S_{0.1}$ is roughly 1750 mAh/g whereas the capacity of the pure Ge film is just under 1500 mAh/g with the capacity of $Ge_{0.95}S_{0.05}$ falling in between. The higher lithium insertion capacity for the higher sulfur content films comes from a feature between 1.3 V and 0.6 V that grows in magnitude with increasing sulfur content. The pure germanium film shows a sloping feature in this same voltage range that is likely due to electrolyte decomposition to form a solid electrolyte interphase (SEI) layer on the electrode. Since the morphology of all three films is similar, the magnitude of charge consumed in SEI formation should be similar for each film. The increase in charge passed in this voltage range—for the sulfur-containing films—is therefore likely due to the reaction of lithium with the sulfur in the film. At potentials below 0.6 V, all three compositions behave similarly with lithiation pseudo-plateaus at 400 mV and 200 mV. The first cycle reversible capacities of the Ge, $Ge_{0.9}S_{0.1}$, and $Ge_{0.95}S_{0.05}$ films are 1230 mAh/g, 1160 mAh/g, and 1120 mAh/g respectively. The weight percentage of sulfur in $Ge_{0.95}S_{0.05}$ and $Ge_{0.9}S_{0.1}$ is 2.3% and 4.7% respectively, and treating the sulfur as non-cycling explains a majority of the differences in reversible capacity between germanium and the substoichiometric germanium sulfides.

Figure 14B:
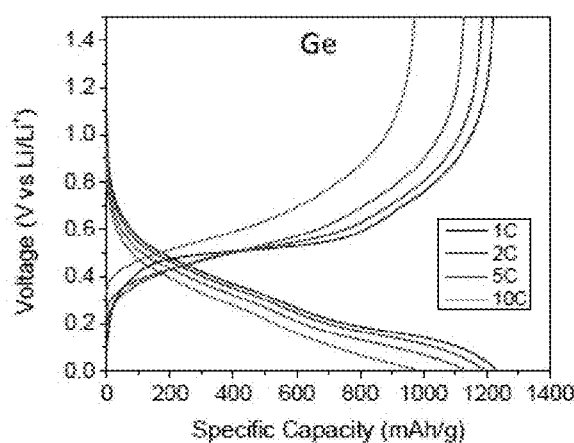
Figure 14C:
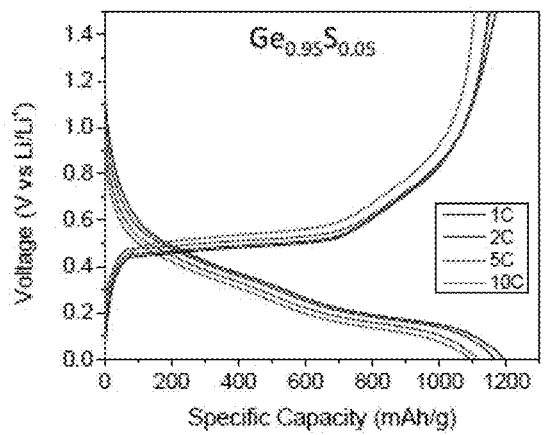
Figure 14D:
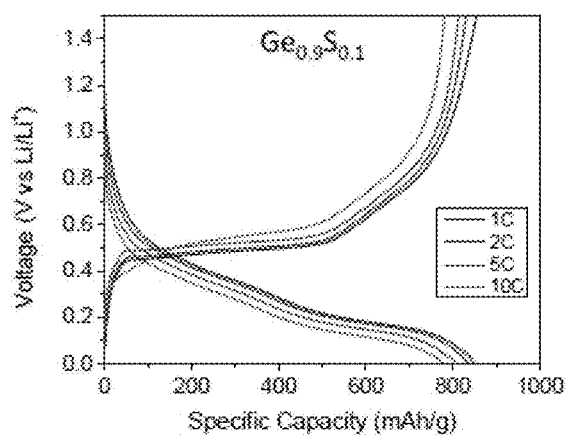

The voltage profiles for each composition at rates up to 10 C are shown in FIGS. 14B, 14C and 14D. For pure germanium, shown in FIG. 14B, significant overpotentials are required to drive lithiation at rates higher than approximately 2 C. Above this rate, the material is not completely lithiated before the electrode reaching the lower cutoff voltage for the test. The overpotentials are significantly reduced for $Ge_{0.95}S_{0.05}$ (shown in FIG. 14C), and $Ge_{0.9}S_{0.1}$ (shown in FIG. 14D), however $Ge_{0.95}S_{0.05}$ exhibits higher reversible capacities and lower overpotentials than the material with higher sulfur content.

Figure 15:
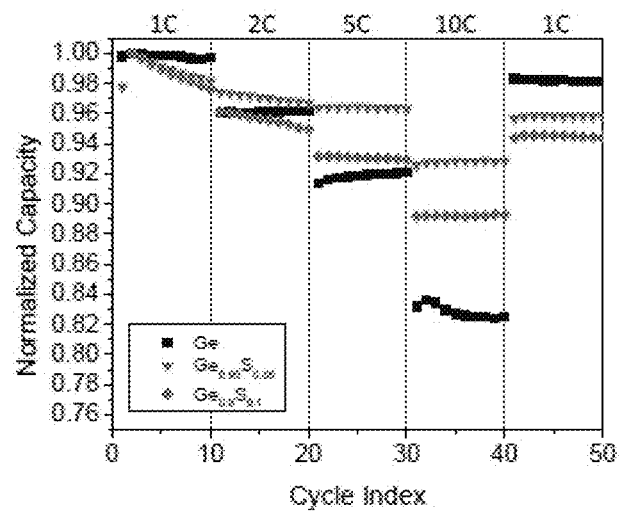
FIG. 15 shows C-rate test results for Ge, $Ge_{0.95}S_{0.05}$, and $Ge_{0.9}S_{0.1}$ films at rates up to 10 C.

The normalized capacity as a function of cycle number for $Ge_{1-x}S_x$ and pure Ge films is shown in FIG. 15. All films had a C/10 conditioning cycle prior to the start of the C-rate test. The films were cycled for 10 cycles each at 1 C, 2 C, 5 C, and 10 C followed by a final 10 cycles at 1 C to assess how the films recover from the high-rate cycling. The pure germanium film exhibits the best stability over the duration of the test, with 98% of the initial capacity retained on cycle 50th. The sulfur containing films show a gradual decline in capacity over the first 20 cycles before stable cycling is achieved. $Ge_{0.95}S_{0.05}$ retains 96% of its initial capacity on cycle 50, and $Ge_{0.9}S_{0.1}$ retains 95%. The superior high-rate capability of the sulfur containing films becomes apparent at 5 C and 10 C despite the losses in capacity during the early cycles. At a rate of 10 C, $Ge_{0.95}S_{0.05}$ retains 93% of its initial capacity while $Ge_{0.9}S_{0.1}$ retains 89% and pure germanium retains 82%.

Figure 16A:
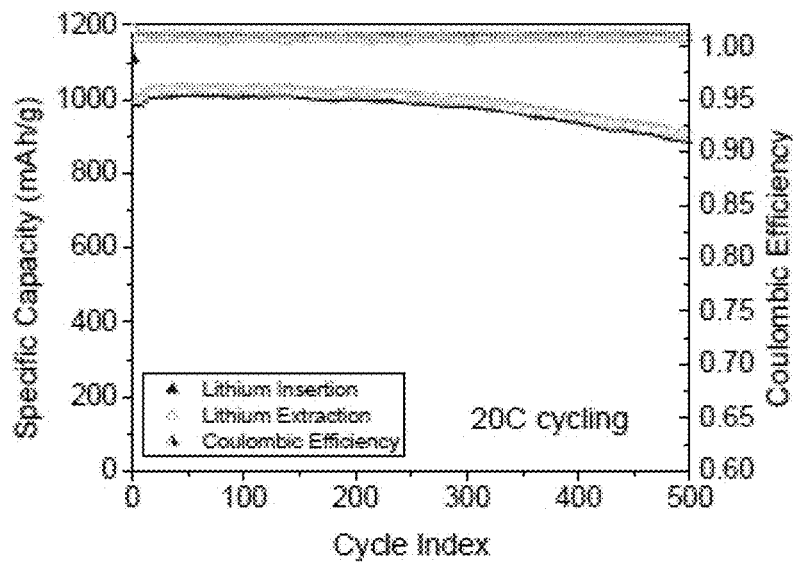
FIG. 16A shows cycle-life testing of $Ge_{0.95}S_{0.05}$ at 20 C for 500 cycles.
Figure 16B:
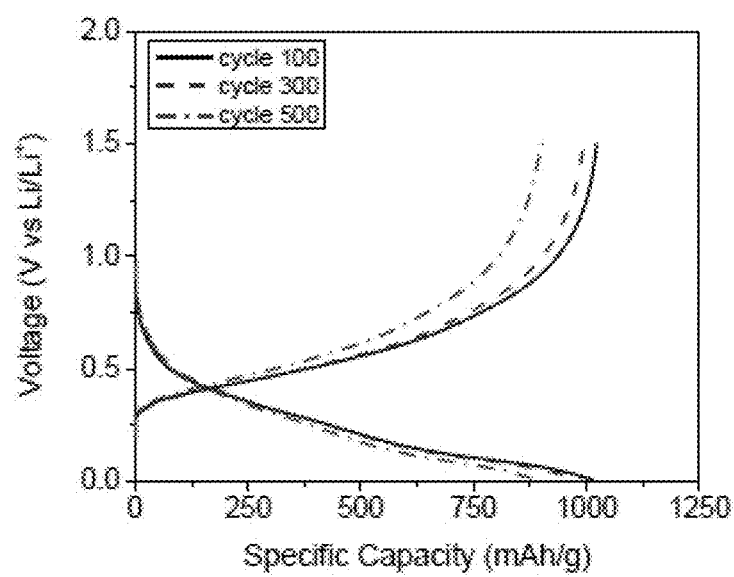
FIG. 16B shows voltage profiles for the 100th, 300th, and 500th cycle of $Ge_{0.95}S_{0.05}$ at 20 C.

The long-term stability of the highest performing composition ($Ge_{0.95}S_{0.05}$) was assessed by repeated cycling at 20 C. The results of this test are shown in FIG. 16. The electrode cycled stably for the first approximately 300 cycles with a specific capacity of just over 1000 mAh/g. After this point the capacity begins to slowly decay. The rate of decrease in capacity is approximately 0.5 mAh/g/cycle, or 0.05% per cycle. After 500 cycles, the capacity is 900 mAh/g, or about 88% of the initial capacity at 20 C. The voltage profiles for the 100th, 300th and 500th cycles are shown in FIG. 16B. The 100th cycle voltage profile looks similar to the 2nd cycle profile shown in FIG. 14, indicating that the high cycling rate does not fundamentally alter the lithiation mechanism of this material. As cycling continues, the capacity decreases and the overpotential increases. This is likely due to a loss of active material which increases the effective C-rate. A ratcheting mechanism, where stresses at the active material/current collector interface increases every cycle, has been shown to be responsible for capacity fade for thin films deposited on copper. Previous studies above on nanocolumnar Si and Ge electrodes deposited on stainless steel showed that a similar failure mechanism was responsible for the capacity fade on repeated cycling.

Example 9—Phase Evolution of Germanium-Sulfide During Cycling

The films of Example 7 above are an amorphous mixture of germanium and sulfur that showed uniform contrast in TEM imaging (FIG. 13), indicating a homogeneous material. This composition is not thermodynamically stable, so the phase evolution of the material during cycling is of interest.

Figure 17A:
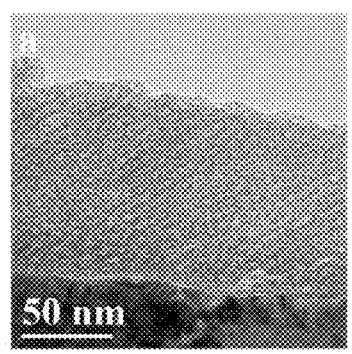
FIGS. 17A-17B show TEM images of a cycled $Ge_{0.9}S_{0.1}$ film.
Figure 17B:
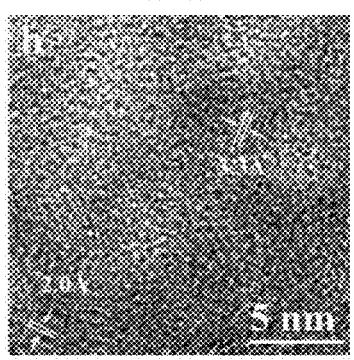

Ex-situ TEM imaging was performed on similarly prepared thin film cross-sections to assess the morphology of the electrode after a single cycle (in the fully discharged state) and the results are shown in FIG. 17. FIG. 17A shows that the outline of the nanocolumnar structure of the electrode is retained. Furthermore, small nano(poly)crystalline inclusions of approximately a few nanometers in size are present in an amorphous matrix (FIG. 17B), indicating phase segregation. The phase segregation can clearly be seen in high angle annular dark field scanning transmission electron microscope (HAADF-STEM) images. The inclusions, while exhibiting measurable lattice fringes of approximately 3.3 or 2.0 Å, appear to be poorly crystallized and are consistent with the d-spacings of germanium or lithium sulfide ($Li_2S$), the anticipated thermodynamic phases. The lattice spacings did not provide for identification of the nano(poly)crystallites because these two species indicated by this measurement (corresponding to their [1 1 1] or [2 2 0] planes) share the same crystal system (cubic), have similar cell parameters (a=5.708 Å for Li2S and a=5.658 Å for Ge), and have similar space-groups (Fm-3m: 225 for Li2S and Fd-3m: 227-2 for Ge) with near-identical allowed lattice planes and d-spacings.

However, the structure factor for monatomic (e.g., germanium, not $Li_2S$) diamond-cubic crystals does not allow observation of the [0 0 2] reflection. While the [0 0 2] can be observed in electron diffraction for thick samples, these crystals are less than 5 nm, as seen in FIG. 17B, and are not expected to produce double diffraction. For detailed analysis of the structure of the nano(poly)crystallites, an electron diffraction technique called diffraction-scanning transmission electron microscopy (D-STEM) was used. In the D-STEM technique, a 1-2 nm near-parallel electron beam probe can be accurately positioned on a STEM image, which allows spot electron diffraction patterns to be obtained. With the narrow D-STEM beam, the diffraction patterns of the nano(poly)crystallites were observed and, by identifying the [0 0 2] reflections, a few of these indicated the presence of Li2S inclusion. For other D-STEM diffraction patterns collected, only reflections common to both germanium and Li2S were observed (namely the [1 1 1], [2 2 0] and [1 1 3] planes), precluding positive identification. As the formation of $Li_2S$ upon lithiation is thermodynamically favorable and remains stable and irreversibly reacted through delithiation to 1.5 V, these other inclusions are most likely poorly crystallized $L_{12}S$. In-situ TEM characterization of the lithiation and de-lithiation of germanium nanowires has previously shown that germanium forms an amorphous phase upon de-lithiation, which is consistent with our observation of the morphous phase surrounding $Li_2S$ inclusions.

The crystallites were also investigated by measuring their composition with electron energy loss spectroscopy (EELS) and EDX collected from spot of the D-STEM beam but the resultant spectra yielded poor signal to noise ratio.

The heterogeneous structure evolved upon cycling, composed of nano(poly)crystallite $Li_2S$ inclusions within an amorphous germanium matrix, is likely responsible for the increased high-rate performance over that of pure germanium as the inclusions create phase boundaries throughout the electrode and diffusion along such boundaries is significantly faster than in through the bulk material.

XRD was performed on the cycled electrodes, however no diffraction peaks were observed. The lack of peaks in the x-ray diffraction pattern does not contradict TEM observations—the poor degree of crystallinity, the low volume fraction, and the small size of the crystallites all contribute to making them difficult to detect by XRD.

Although only exemplary embodiments of the invention are specifically described above, it will be appreciated that modifications and variations of these examples are possible without departing from the spirit and intended scope of the invention. For example, throughout the specification particular measurements are given. It would be understood by one of ordinary skill in the art that in many instances particularly outside of the examples other values similar to, but not exactly the same as the given measurements may be equivalent and may also be encompassed by the present invention. As another example, one of ordinary skill in the art would recognize that, in at least some embodiments, a lithium ion batter may also include batteries where the alkali metal is sodium or is a mixture of sodium and lithium.

The invention claimed is:

1. An anode comprising an active anode material comprising a sub-stoichiometric chalcogen-containing composition of the general formula $Q_yX_z$, wherein the Q comprises germanium (Ge), tin (Sn), or lead (Pb) or a combination thereof, and X comprises sulfur (S) or selenium (Se) or a combination thereof, and wherein y:z is between 80:20 and 98:2.

2. The anode of claim 1, wherein Q consists essentially of Ge.

3. The anode of claim 2, wherein X consists essentially of selenium (Se).

4. The anode of claim 3, wherein y:z is between 85:15 and 95:5.

5. The anode of claim 3, wherein the active anode material further comprises lithium.

6. The anode of claim 3, wherein the active anode material further comprises sodium.

7. The anode of claim 3, wherein the sub-stoichiometric chalcogen-containing composition comprises a plurality of nanocolumns.

8. The anode of claim 3, wherein the sub-stoichiometric chalcogen-containing composition comprises a plurality of particles.

9. The anode of claim 8, wherein the particles comprise microparticles.

10. The anode of claim 8, wherein the particles comprises nanoparticles.

11. The anode of claim 2, wherein X consists essentially of sulfur (S).

12. The anode of claim 11, wherein the active anode material further comprises lithium.

13. The anode of claim 11, wherein the active anode material further comprises sodium.

14. The anode of claim 11, wherein the sub-stoichiometric chalcogen-containing composition comprises a plurality of nanocolumns.

15. The anode of claim 11, wherein the sub-stoichiometric chalcogen-containing composition comprises a plurality of particles.

16. The anode of claim 15, wherein the particles comprise microparticles.

17. The anode of claim 15, wherein the particles comprises nanoparticles.

18. The anode of claim 1, wherein Q consists essentially of Sn.

19. The anode of claim 1, wherein Q consists essentially of Pb.

20. The anode of claim 1, wherein the sub-stoichiometric chalcogen-containing composition is amorphous.

* * * * *